United States Patent

[11] 3,565,413

| [72] | Inventor | Guenter Strauff<br>Hanaverweg 26, Kaarst 4044, Germany |
|---|---|---|
| [21] | Appl. No. | 773,575 |
| [22] | Filed | Nov. 5, 1968 |
| [45] | Patented | Feb. 23, 1971 |
| [32] | Priority | Dec. 13, 1967 |
| [33] | | Germany |
| [31] | | P 16 30 747.4 |

[54] HYDROPNEUMATIC RESILIENT SUSPENSION CYLINDER
3 Claims, 2 Drawing Figs.

[52] U.S. Cl. .................................................. 267/64
[51] Int. Cl. .................................................. F16f 9/10
[50] Field of Search .................................. 267/64 (V), 64 (A), 65 (V), 65 (A)

[56] References Cited
UNITED STATES PATENTS

| 3,353,814 | 11/1967 | Rees et al. ................ | 267/64 |
| 3,367,235 | 2/1968 | Andrews ................... | 267/64 |

*Primary Examiner*—James B. Marbert
*Attorney*—Holman & Stern

ABSTRACT: A hydropneumatic resilient suspension cylinder for vehicles adapted to be arranged between the wheel supporting means and the vehicle body for stabilizing the height of the vehicle body independently of the load variations on the vehicle by means of a level control device located within the cylinder housing and which independently of the height of the car body above the wheel supporting means connects the pressure space of the cylinder with either a pressure source or with a drain.

INVENTOR
GUNTER STRAUFF

BY Glascock, Downing + Seebold
ATTORNEYS

HYDROPNEUMATIC RESILIENT SUSPENSION CYLINDER

BACKGROUND OF THE INVENTION

The present invention pertains a hydropneumatic resilient suspension cylinder for use with vehicles with such cylinder being arranged between the wheel supporting means and the vehicle body for stabilizing the height of the vehicle body independently of load variations on the vehicle.

In some of the known suspension cylinders of this type, the piston per se assumes the function of a control valve in that it opens or closes grooves or bores in the wall of the cylinder or forces open a releasable check valve. For some particular applications, such designs are objectionable in that dependent upon the position of the piston without distinction being made between static and dynamic loads equal cross sections are always open. However, only a response to a static load variation is desired and dynamic load variations such as caused by irregular road terrain, etc. are to have no effect.

A further disadvantage of this particular structure is that the necessary tube or hose lines must be connected radially at approximately the center of the suspension cylinder and this measure is not always practicable for reasons of space. Furthermore, the telescopic protective tubes frequently provided for the protection of the piston rod, the packings, and the cylinder against foreign matter such as dirt and corrosion cannot be employed.

SUMMARY OF THE INVENTION

The salient object of the present invention is to provide a resilient suspension cylinder which overcomes the above objectionable features which exist in the art and to provide a highly compact suspension cylinder.

The problem is solved in that the level control means includes a control piston sliding in the cylinder head and movable between abutments with the cylinder head starting from a level position upon retraction of the piston being moved by a spring arranged within the cylinder head into a position providing a connection between the pressure space of the cylinder and a pressure source and upon extension of the piston beyond such level position against the action of the spring is displaced by a tension spring whose abutment is carried along by the piston only in such region to provide communication between a drain and the pressure space in the cylinder.

In a preferred embodiment of the invention the abutment for the extension spring is constituted by a sleeve slidable in a hollow piston and moved along by a stop with the extension spring being a spiral spring threaded into the sleeve.

The zone of the spring may be connected either with the pressure space or with the drain and a throttle is preferably installed in such connection for obtaining a better damping effect.

DETAILED DESCRIPTION OF THE INVENTION

Figure 1:
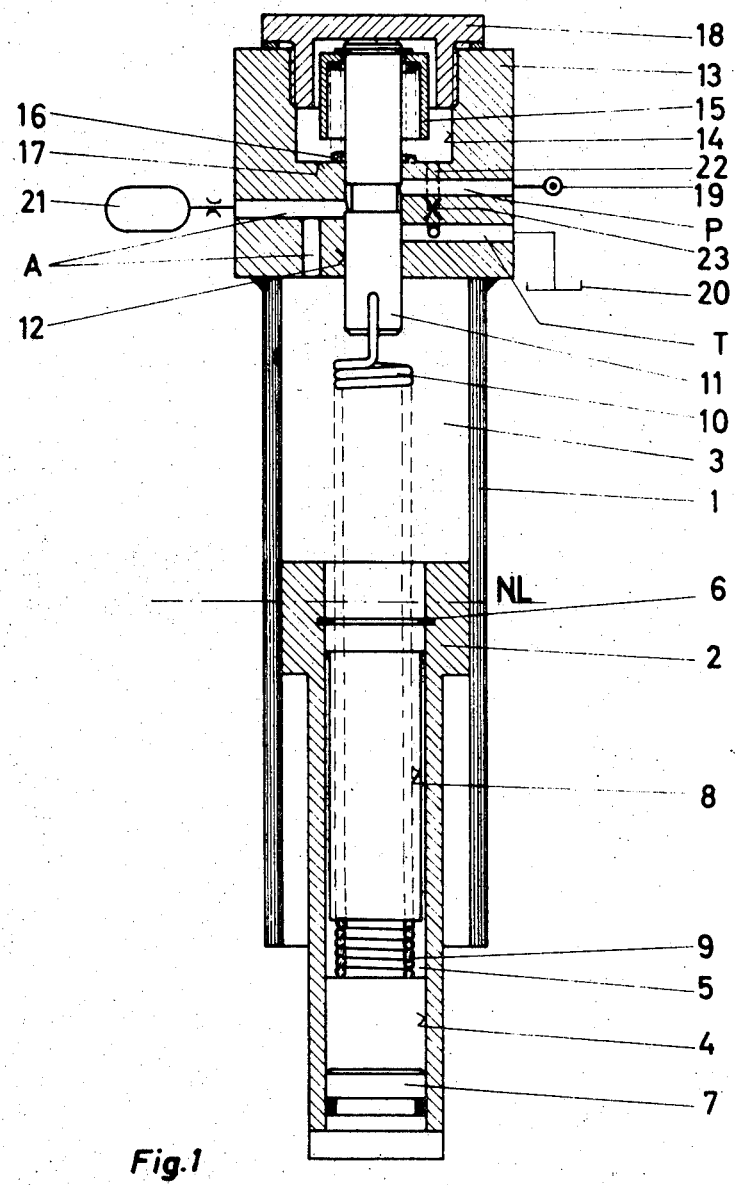
FIG. 1 is a view partly in vertical cross section and partly in elevation of a resilient suspension cylinder embodying the present invention and with the piston being illustrated in the retracted position.

It will be noted in FIG. 1 that a piston 2 is slidable in a cylinder 1 provided with a cylinder head 13. The piston 2 has a blind bore 4 which opens into a pressure space 3 provided between the piston and the head 13 and a sleeve 5 is slidable in the bore 4. The stroke or movement of the sleeve 5 is limited by upper and lower stops 6 and 7 respectively, and it will be noted that the sleeve 5 is provided with a through bore and a portion thereof is threaded as shown at 9 and into which threaded portion a spiral tension spring 10 is threaded. It is believed apparent that the spring 10 traverses the sleeve 5, the bore 4 and the pressure zone 3.

The upper end of the spring 10 is connected to a control piston 11 movable in the head 13 and which piston is slidable in a bore 12 of the head 13 and also protrudes into the pressure space 3. The free end of the control piston 11 projects into a bore 14 formed in the cylinder head 13 and is connected in this area with a resilient disc 15. A spring 16 coacts with the disc 15 and the lower end of the spring bears against bottom 17 of the bore 14 while the other end of the spring bears against the end of the disc. A cover 18 tightly closes the upper end of the bore 14.

It will be seen that a passage or bore P in the cylinder head 13 leads to a pressure source 19 and a passage T is in communication with a drain 20. A passageway A leads to a hydropneumatic pressure reservoir 21 and leakage bore 22 provides communication between the bore 14 and the passageway T. A throttle 23 is installed in the leakage bore 22.

It is believed readily apparent that in a first position the control piston 11 provides communication between passages A and P and in a second position between passages A and T.

As illustrated in FIG. 1, the piston 2 is retracted beyond a level position denoted NL and due to this retracted movement, the stop 6 is removed from the upper end of the sleeve 5 and the spring 10 is relaxed. Hence, the control piston 11 is forced upwardly via the disc 15, spring 16 and the pressure existing in the pressure space 3 thus establishing a connection between the passages P and A. As a result, liquid then flows from the pressure source 19 into the pressure space 3 and effects an extension of the piston 2. During this extending movement the piston arrives at the position in which the sleeve 5 again abuts the stop 6 and as the spring 10 is sufficiently strong that it overcomes the action of the spring 16 and the force exerted by the liquid pressure on the control piston 11, the control piston 11 is displaced downwardly by the spring 10 until the passage P is blocked. In this position, the passage T is also closed.

Figure 2:
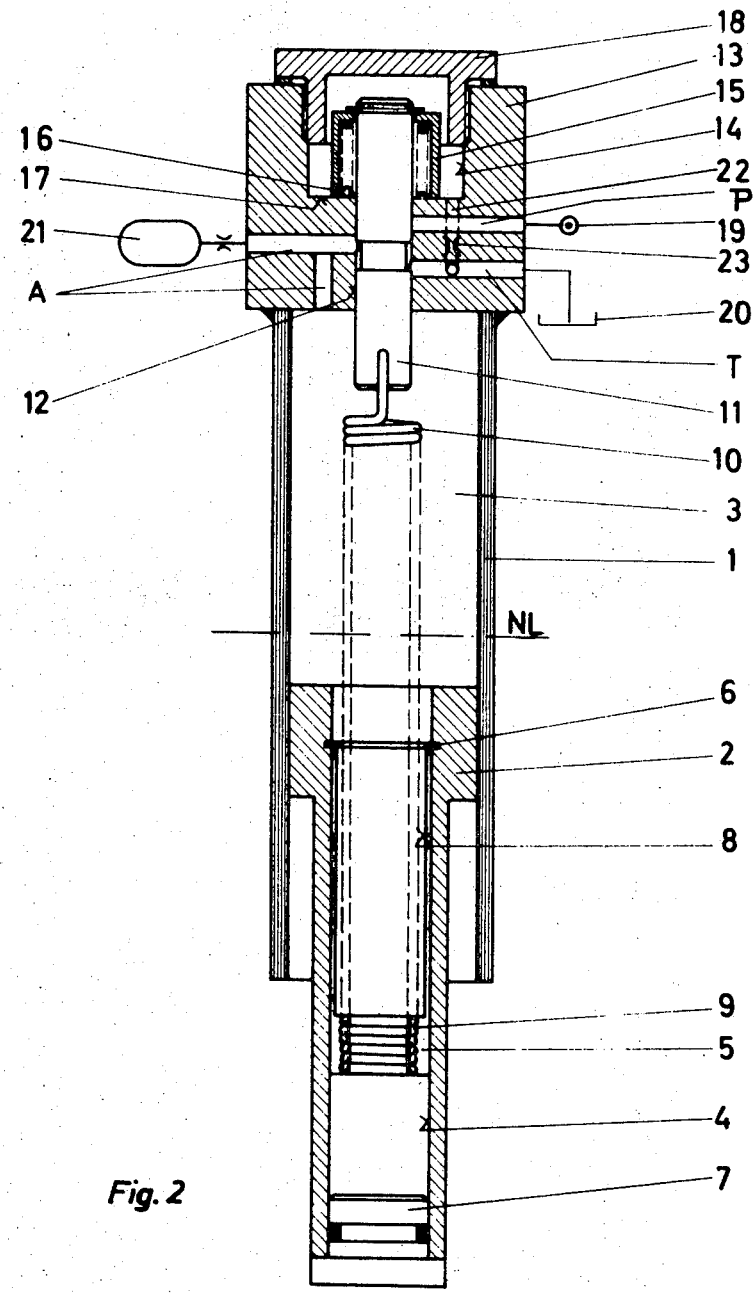
FIG. 2 is a view similar to FIG. 1 illustrating the piston in its extended position.

When the vehicle is relieved, the liquid flow from the pressure reservoir 21 through the passage A into the pressure space 3 and as a consequence causes a further extension of the piston 2. The control piston 11 through the sleeve 5 and spring 10 is pulled downwardly until the passages A and T are in communication and in the case of a very strong spring expansion movement, until the disc 15 strikes the bottom 17 of the bore 14 as indicated in FIG. 2. The liquid by virtue of the passageways A and T flows out of the pressure space 3 and the piston 2 again retracts and in the level position, the control piston 11 again prevents communication between the passages P and T. The spring expansion travels which exceed the maximum stroke of the control piston 11 are absorbed by the extension spring 10 and spring compression movements are not directly transmitted and the throttle 23 provides for damping of the control piston.

It is also to be understood that the control piston 11 may be in the nature of a stepped piston whereby an annular space damping can be additionally obtained. In order to reduce the size of the spring 10 it may be advisable to connect the bore 14 with the pressure space 3 and not with the passage T so that the control piston 11 is relieved hydraulically.

I claim:

1. A hydropneumatic resilient suspension cylinder adapted to be arranged between a wheel supporting means and a vehicle body for stabilizing the height of the vehicle body independently of load variations on the vehicle, comprising a cylinder housing, a head for the cylinder housing, a piston slidable in the housing and a level control means within the housing operative independently of the height of the vehicle body above the wheel supporting means for connecting the pressure space of the cylinder housing with either a pressure source or drain, said level control means including a control piston slidable in said head, said head having passages therein communicating with the pressure space, the pressure source and drain with such passages being controlled by said control piston, spring means within the cylinder head operably related to the control piston upon retraction of the piston from the level position to move the control piston to a position in which communication is provided between the pressure space and pressure source via the passages, a tension spring operably connected to the control piston, and an abutment for the tension spring movable by the piston so that upon extension of the piston beyond the level position against the force of the spring means, the control piston is moved to establish a connection between the drain and the pressure space via the passages while in the level position said passages are blocked by the control piston.

2. The hydropneumatic spring suspension cylinder as claimed in claim 1 in which said abutment includes a sleeve slidable in said piston and stop means for moving said sleeve with said piston.

3. The hydropneumatic resilient suspension cylinder as claimed in claim 2 in which said tension spring is a spiral spring threaded into said sleeve.